US006457927B1

(12) United States Patent
Schneider

(10) Patent No.: US 6,457,927 B1
(45) Date of Patent: Oct. 1, 2002

(54) APPARATUS FOR STACKING AND DELIVERING PLASTIC BAGS, ESPECIALLY BAGS FOR PACKAGING MACHINES

(75) Inventor: Jakob Schneider, Niederkassel (DE)

(73) Assignee: Lemo Maschinenbau GmbH, Niederkassel-Mondorf (DE)

(*) Notice: Subject to any disclaimer, the term of this patent is extended or adjusted under 35 U.S.C. 154(b) by 0 days.

(21) Appl. No.: 09/580,256

(22) Filed: May 26, 2000

(30) Foreign Application Priority Data

May 28, 1999 (DE) ........................................ 199 24 625

(51) Int. Cl.[7] ................................................ B65G 57/00
(52) U.S. Cl. ......................................................... 414/27
(58) Field of Search ................................ 414/27, 790.2; 198/693, 468.2; 493/204

(56) References Cited

U.S. PATENT DOCUMENTS 3,625,338 A 12/1971 Cawley
4,021,291 A 5/1977 Joice
4,668,148 A * 5/1987 Sample et al. ................ 414/50
4,925,439 A * 5/1990 Schneider ................... 493/204
5,738,478 A 5/1996 Pickering
5,522,690 A * 6/1996 Pickering ..................... 414/27

FOREIGN PATENT DOCUMENTS

DE 38 34 115 5/1990
DE 198 47 932 4/2000
EP 0 645 238 7/1994

* cited by examiner

*Primary Examiner*—Christopher P. Ellis
*Assistant Examiner*—Khoi H. Tran
(74) *Attorney, Agent, or Firm*—Herbert Dubno

(57) ABSTRACT

A device for stacking and delivering plastic bags, especially for stacks to be fed to automatic packaging machines and used in conjunction with a bag making apparatus. The conveyor has needles piercing through the bags which are stacked on the conveyor and a gripper hand can engage the stack to remove it from the conveyor. The gripper hand has a stripping aid engaging the stack in the region of the needles to facilitate withdrawal of the stack from the needles.

8 Claims, 4 Drawing Sheets

APPARATUS FOR STACKING AND DELIVERING PLASTIC BAGS, ESPECIALLY BAGS FOR PACKAGING MACHINES

FIELD OF THE INVENTION

My present invention relates to an apparatus for the stacking and delivery of plastic bags, especially bags for use in automatic filling or packaging machines and, more particularly, to an apparatus wherein one or more bags and preferably a stack of bags are delivered by a movable stack chain and at the discharge station a robot with a gripping hand is engageable with the stack to remove it from the chain or conveyor.

BACKGROUND OF THE INVENTION

The use of a robot to remove stacks of bags from an endless conveyor is disclosed in general terms in DE 38 34 115 C1. The device described in this patent requires the connection of the bags of the stack with a wire stirrup and the removal of the stack mounted on the stirrup or connected by the stirrup, utilizing the robot. The robot and its construction and operation is not described in detail, although the patent does recognize that robots utilized for handling stacks of bags are generally complex and expensive.

In DE 198 479 32, corresponding to copending U.S. application Ser. No. 09/535,713 filed Mar. 27, 2000 (U.S. Pat. No. 6,315,516 issued Nov. 13, 2001), the use of a robot for the removal and transfer of bag stacks is also described. In this case, stacks of plastic bags having bottom folds are collected upon pins which pass through openings previously formed in the bags. At a discharge station, the stacks are removed from the bag for packaging. The operation is automated and the improvement described in that application serves to simplify and accelerate the transfer of the stack.

To enable the bags to be mounted on the pins, the bags are preformed with relatively large hanging openings and the stacking pins are provided in pairs to allow the bags to be suspended on the pins and collected in stacks, utilizing these is openings. The bags and the stacks formed on the pins hang freely from the latter. The stacks can be fused or joined into pads or collections of the bags for packaging.

OBJECTS OF THE INVENTION

It is the principal object of the present invention to provide an improved apparatus which can serve for the delivery of plastic bags or stacks of plastic bags, especially plastic bags for use in automatic packaging machinery, whereby the removal of the bags or stacks from the stacking device is facilitated and the bags or their stacks can be transferred at a delivery station without difficulty.

It is also an object of this invention to provide an improved transport and delivery apparatus which eliminates the need to provide large openings in a bag for suspension of the bag from the stack conveyor and nevertheless ensure effective and reliable delivery of the bags or stacks thereof.

Still another object of this invention is to provide an apparatus for delivering plastic bags, e.g. as stacks, whereby drawbacks of earlier systems are eliminated.

SUMMARY OF THE INVENTION

These objects and others which will become apparent hereinafter are attained, in accordance with the invention, by providing, as the stacking elements of the conveyor, needles piercing through the plastic bags while the robot hand or grip is provided with stripping means cooperating with the needles. Because of the configuration of the stacking elements as needles, it is no longer necessary to form the plastic bags with relatively large, stamped out suspension holes. While the plastic film material of the bag grips the needles tightly and lies adjacent the needles, the invention provides that any problem because the bags hug the needles can be obviated by providing the gripper or gripping hand with stripper means cooperating with the needles for overcoming any retention force between the needles and the bags.

The stripping means provided for this purpose can be comparatively simple and can comprise a support element and a holding element movably mounted relative to the support element. The support element can have a shank or arm which engages beneath the plastic bag or the stack of plastic bags and preferably an upper shank which is parallel to that lower shank but is spaced therefrom.

Between the two shanks a stripper element with a holding element is provided which can be displaced on a piston rod of a piston and cylinder unit to which those elements can be attached so that the elements are displaced by the piston and cylinder units. The device, namely, the gripping hand, can be so configured that it closely surrounds the needle and encompasses the needle through at least 180° and provides during the clamping and withdrawal operations a retraction function.

According to one aspect of the invention, the apparatus for stacking and transporting or delivering plastic bags, especially plastic bags for automatic packaging machines, comprises a stacking chain which is cyclically movable and has stacking elements forming a conveyor therewith and cooperating with the robot at the delivery station. The robot has a gripper hand with a tongs-like gripping action. The stacking elements of the conveyor are formed as needles and the gripping hand is provided with a stripper facility cooperating with the needles.

The stripper facility can comprise a support element and a holding element movable relative thereto. The support element has a shank which engages below the end of the bag or stack of bags pierced by the needles and, possibly, an upper shank parallel to that lower shank, both of which extend inwardly on the gripper hand. The two shanks and the support element in cross section can form a substantially U-shaped transverse beam or bar. The upper shank can carry the piston and cylinder unit previously mentioned which can be so constructed and arranged as to prevent rotation of the piston rod or the elements thereon. The holding element affixed to the piston rod can have a z-shape and can engage around the needle through at least 180°. The holding element can have one part of the Z which is affixed to the piston rod of the piston and cylinder unit and another part of the z parallel to the first part and which is formed with a longitudinal slit opening toward the needle.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
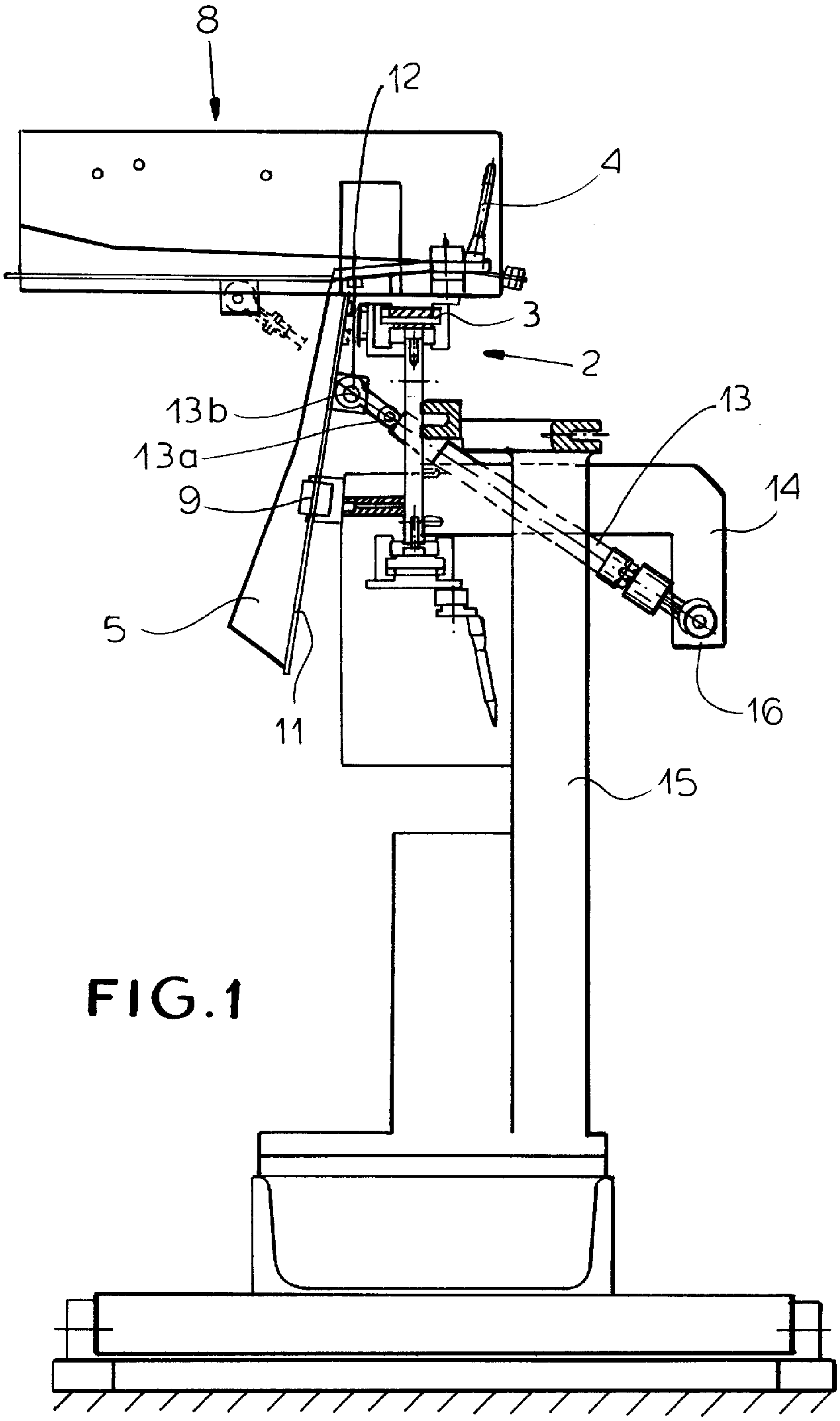
FIG. 1 is a side elevational view of a conveyor unit showing a part of the gripping hand of a robot according to the invention.

FIG. 1 of the drawing shows the conveyor portion of a bag making machine for producing plastic bags especially plastic bags with a bottom fold. Reference may also be had to the aforementioned copending application.

In such a machine, a plastic film strip of a thermoplastic synthetic resin, usually a strip of blown film, is unwound from a roll on an unrolling stand. The film strip or web is generally provided with a fold which will form the bottom of the bag and the bags are defined by providing transverse seams across the web and by stamping out those portions which are required to be removed to form handles or the like.

The web is advanced by drive rollers and tension is maintained therein by tensioning rollers The transverse separating and welding devices define individual bags which separate from the strip. The bags can be mounted on a conveyor 2 after they have been separated from the strand and, indeed, the bags can be stacked on the conveyor to form bag stacks 5. The bags of the stack may be fused or adhesively bonded together in pads or packages from which individual bags will be removed in an automatic packaging machine or the like.

The conveyor (FIG. 1) can thus have a stacking chain 3 which is provided with upstanding pairs of needles 4 which are inclined and on which the bags are collected so that the bags hang freely downwardly. As has been noted, the bags of the stack may be padded together, i.e. joined, so that they can easily be separated, or can remain loose in the respective stack.

After the formation of a bag stack on the stacking chain, the completed bag stack is removed at the end of the conveyor 2 with the aid of a robot 6 (FIG. 2) which has not been shown in detail except for its robot arm 7 and its gripper hand 8. The function of the robot and its gripper hand will be developed below.

At the discharge station of the conveyor, for better guidance of the bag stack 5, at least one freely rotatable roller 9 is provided which holds the bag stack at a slight distance from a pivotal plate, swingably mounted at its upper end on the conveyor 2 so as to pivot about the axis 12 (FIG. 1)

With the aid of this pivotal plate 11, the stack 5 of bags can be swung from its hanging position shown in FIG. 1 into a substantially horizontal position, illustrated by outline in FIG. 1. For swinging the plate 11, a positioning cylinder 13 is provided.

The cylinder 13 is pivotally mounted on an arm 14 of the machine support 15 at 16 and has a cylinder rod 13a pivotally connected at 13*b* on the underside of the plate 11.

Figure 2:
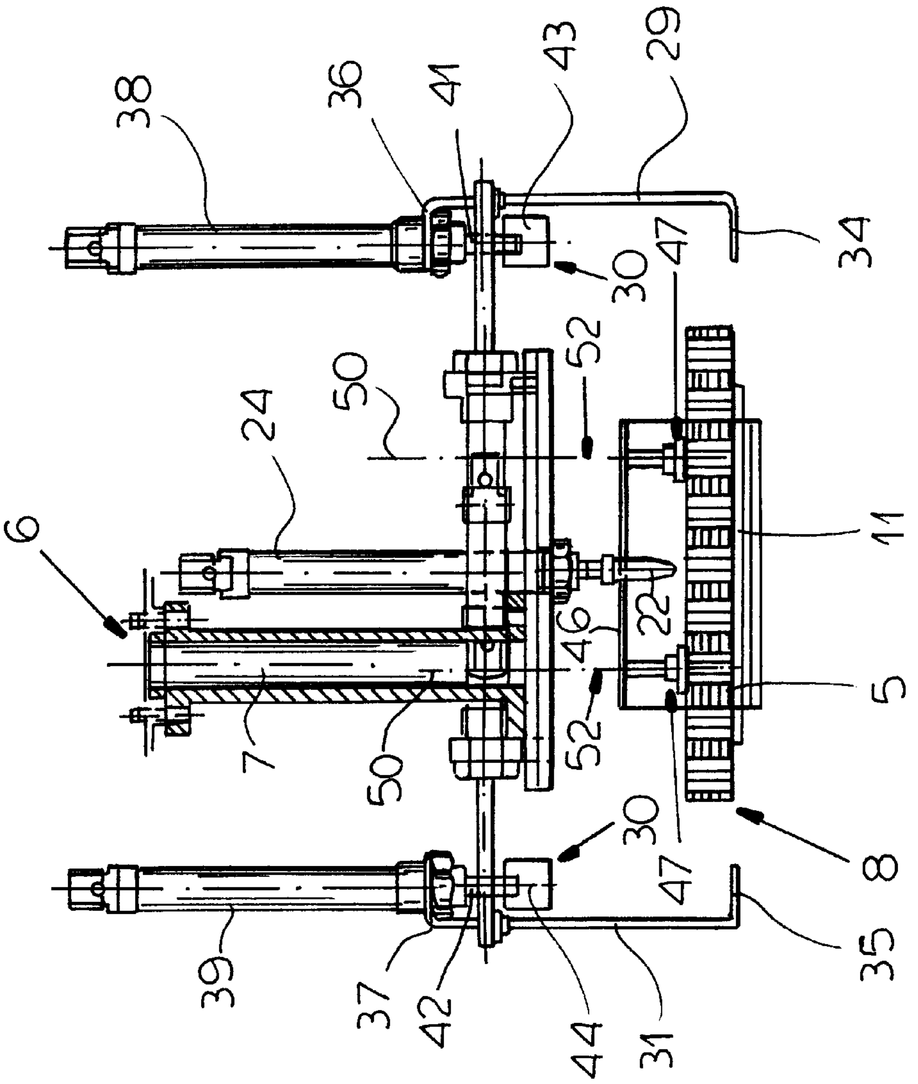
FIG. 2 is a partial sectional view through the gripping hand in a position in which the parts thereof are spread apart.
Figure 3:
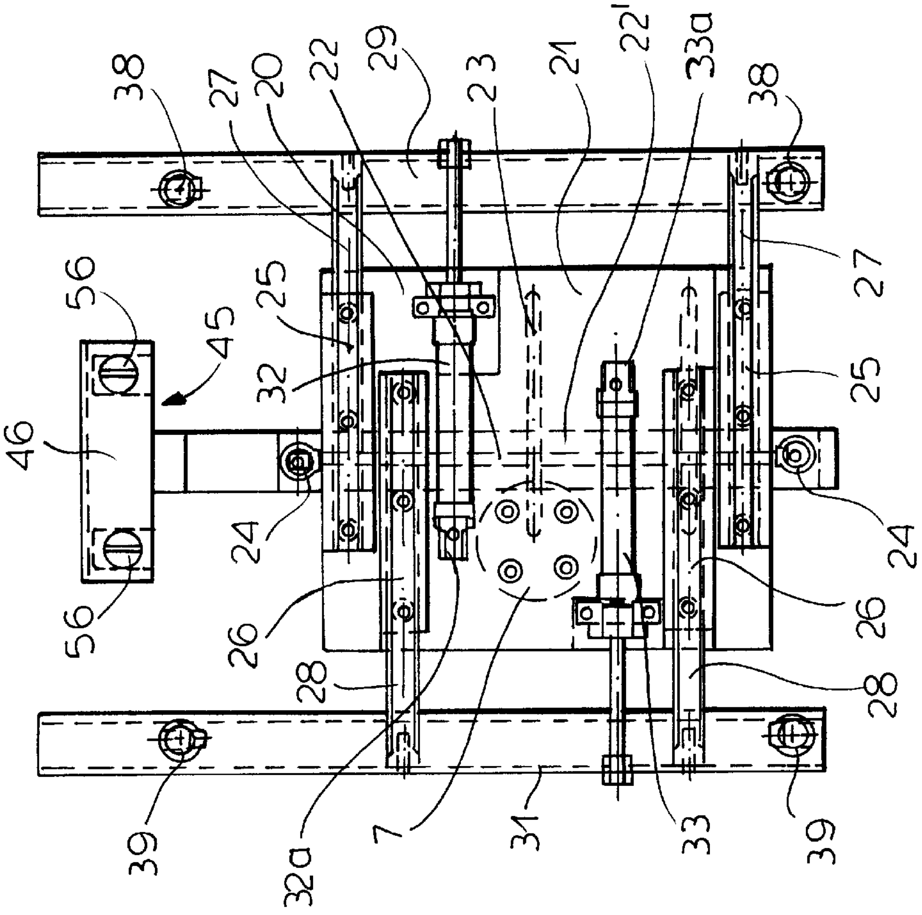
FIG. 3 is a plan view of the gripping hand.

As can be seen from FIGS. 2 and 3, the gripper hand 8 of the robot has relatively shiftable support plates 20 and 21 which overlap one another and are relatively shifted on a longitudinal guide 23 and are carried via the guide 23 by the arm 7 of the robot 6.

At a spacing from the underside of the support plate 20, via a support beam 22' a pressure element 22 is mounted to form a prebuckling bar which serves to buckle the stack (see the aforementioned copending application).

The prebuckling bar or pressure element 22 can be adjusted as to its height via adjusting cylinders 24 which can also press the buckling bar 22 downwardly into engagement with the stack of bags.

On the support plates 20 and 21, offset from one another are guide rails 25 and 26 which are paired and provided to one side and the other side of a longitudinal median plane through the gripper hand as will be apparent from FIG. 3. That longitudinal median plane can pass through the axes of the cylinders 24 and the prebuckling bar or strip 22.

The guide rails 25 and 26 serve to receive support arms 27 and 28 which are displaceable on the guide rails and are provided pair wise to one side and the other side, respectively. The guide rails serve to receive, therefore, the shiftable support arms 27 and 28 on which diametrically opposite holding channels 29 and 31 are mounted. The channels 29 and 31 are movable toward and away from one another symmetrically. For opposite displacement of the support channels 29 and 31 toward and away from each other, into a position in which they engage the stack of bags 5 and into a position in which they release the bags 5, respectively, respective piston and a cylinder units 32, 33, are provided, the cylinder in each case being pivotally mounted on the support plate 20, 21 at 32*a* and 33*a*, respectively, one on the support plate 20 and the other on the support plate 21. The channels 29 and 31 have lower webs or arms 34, 35 and upper webs or arms 36, 37. In each of the upper webs 36, 37, clamping cylinders 38, 39 are mounted whose piston rods 41, 42 have clamping pieces 43, 44.

In FIGS. 2 and 3 the gripper hand 7 with its clamping units 30 is shown in its outer position such that it can engage the bag stack 5. For this engagement the bag stack 5 rests on the pivot plate 11 substantially in the horizontal position of the latter.

To facilitate the removal of the bag stack 5 from the stacking chain, the gripper hand 8 is provided with a stripper aid. This cooperates with the needles 4 of the conveyor 2 and has a support element 46 and a holding element 47 movable relative thereto. The support element 46 has, at the end of the stack of bags transfixed by the needles 4, a flange member 48 that engages beneath the stack of bags is capable of lifting that stack off the needles. The flange member 48 is located in the region of the inwardly extending flange 49 of the gripper hand 8 and the member 48 can have a slit in it which the needle 4 is received so that this member straddles the needle.

The support 46 is of channel shape and hence there is an upper shank 51 parallel to the lower shank 48 and on which a piston and cylinder unit 52 is affixed. This unit has its lower end juxtaposed with the respective needle 4. On the piston rod 53 of each cylinder unit 52 for each needle 4 is a fastening piece 54 of the holding element 47 which is mounted so that it cannot rotate about the axis of the cylinder 52.

Figure 4:
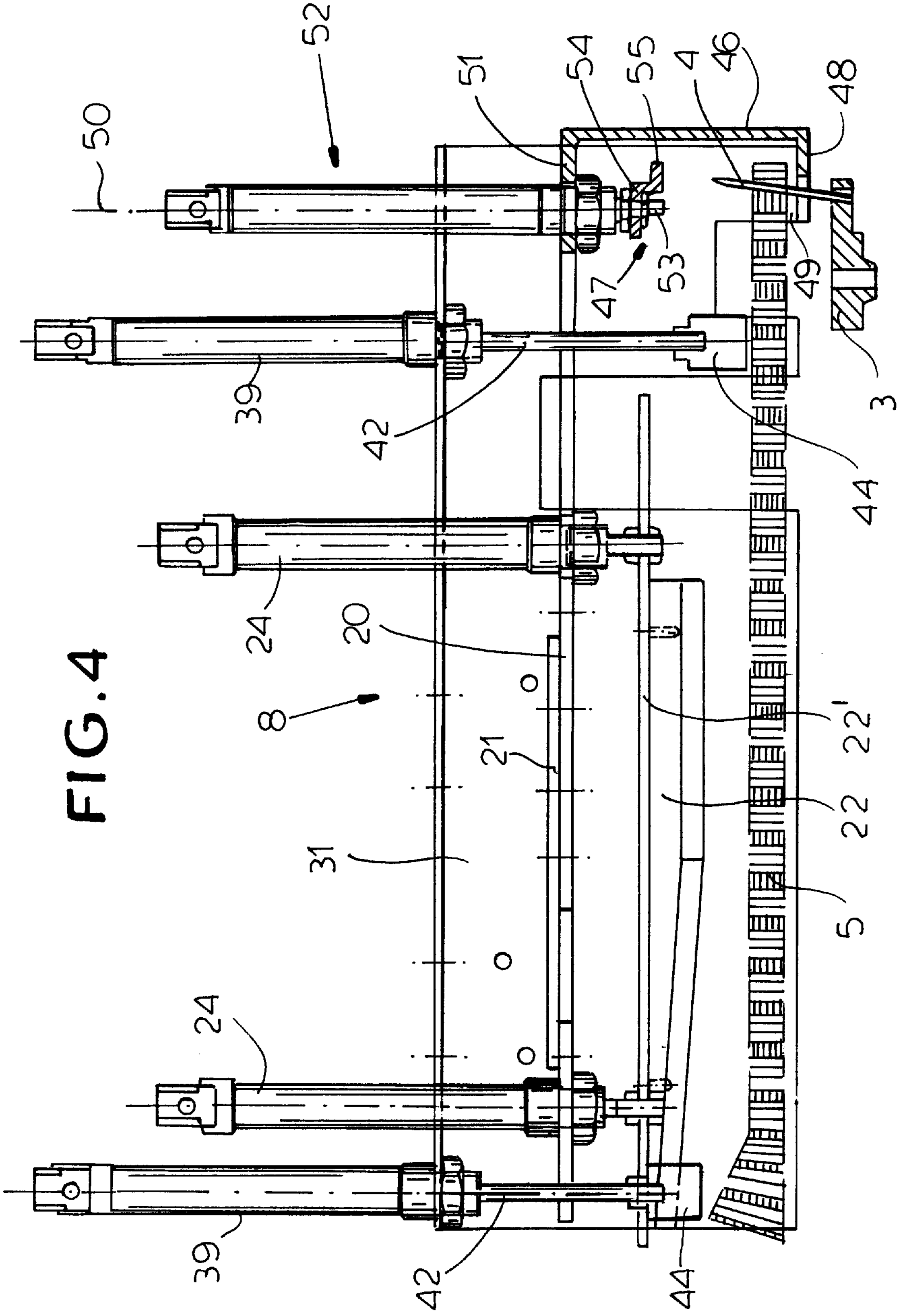
FIG. 4 is a partial longitudinal section through the gripper hand.

The holding element 47, in addition, has a clamping part 55, secured to the fastening part 54 and closely surrounding the needle 4 through at least 180° when the element 47 is lowered, from the position shown in FIG. 4, onto the stack 5.

The device of the invention operates as follows:

The gripper hand is initially in its unengaged position shown in FIG. 2, i.e. the channels 29 and 31 are spread outwardly and do not engage around the stack of bags. The pivotal flap 11 of the conveyor unit 3 is swung upwardly by the cylinder 13 so that the bag stack is brought from its freely hanging position into a horizontal position (compare the positions visible in FIG. 1). In this horizontal position, shown also in FIG. 4, the channels 29 and 31 are displaced inwardly by the piston and the cylinder units 32 and 33 so that the webs 34 and 35 of the channels 29 and 31 engage beneath the bag stack 5.

In this engaged position, the pressing element 22 is applied against the stack to enable the latter to buckle inwardly. In the meantime, the clamping cylinders 38 and 39 have been actuated to clamp the edges of the stacks against the webs 34 and 35 with the clamping pieces 43 and 44 at the ends of the piston rods 41 and 42.

In addition, while the stack is centered between the webs 34 and 35 and clamped thereagainst, the holding element 47 is lowered onto the upper side of the stack 5 so that, in combination with the web 48 of the support 46 engaging the stack from below, the end of the stack pierced by the needles 4 is gripped.

Figure 5:
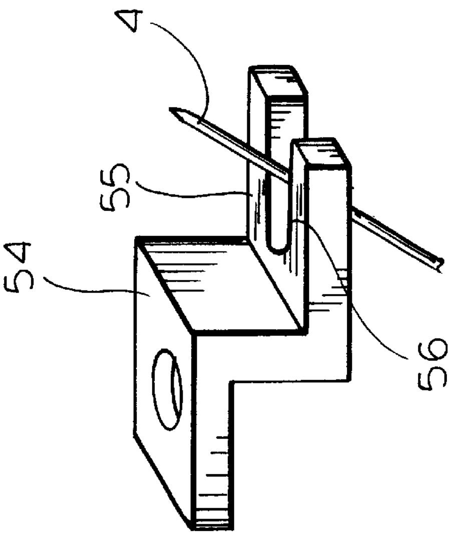
FIG. 5 is a diagrammatic perspective view showing the holding element and its needle.

Since the needles 4 are inclined and the axis 50 of the piston unit 52 is substantially vertical, in the clamping part 55 and in the part 48, slits 56 are provided as can be seen from FIG. 5. Upon raising of the gripper hand 8 from the conveyor, the stripper aid comprised of the support element 46 and the holding element 47, lifts the bag stack cleanly from the needles 4. The stack can be carried by the robot 6 for delivery to a package or an apparatus utilizing the bags. Usually the packaging apparatus includes boxes which are to be filled with the stacks. When the robot is in the correct position, the cylinders 38 and 39 move upwardly, the buckling member 22 is pressed downwardly and the stack, buckled in a V-shape is placed into the package. The thicker fold bottom region of the stack is not engaged and the stack can lie freely in the box to facilitate removal of the bags therefrom. The plate 11 is then swung downwardly and the robot arm returned to its original position.

I claim:

1. An apparatus for stacking and delivering plastic bags comprising:

- a cyclically operating conveyor having upstanding needles adapted to traverse plastic bags in the stacking thereof on said needles;
- a gripper hand of a robot engageable with a stack of said bags on said needles and having a flange supporting said stack at an end of said stack;
- a stripper on said hand adapted to grip said stack adjacent said needles for facilitating the withdrawal of said stack from said conveyor, said stripper comprising a stripping element engageable beneath said stack at an end thereof traversed by said needles and a holding element relative to said stripping element for engagement with said stack, said stripping element comprising a channel engageable around said end of said stack and having a lower shank engaging beneath said end of said stack to an upper shank on said stripper element overlying the first mentioned shank, said holding element for each needle being mounted on a piston and cylinder unit on said upper shank for linear displacement by said piston and cylinder unit.

2. The apparatus defined in claim 1 wherein said lower shank engages said end of said stack at said flange of said gripper hand supporting said stack.

3. The apparatus defined in claim 2 wherein said stripper element has a U-section beam shape.

4. The apparatus defined in claim 1 wherein said holding elements are each mounted on a free end of a piston rod of the respective piston-cylinder unit.

5. The apparatus defined in claim 1 wherein each holding element is substantially Z-shaped in cross section.

6. The apparatus defined in claim 5 wherein each of said holding elements has a first portion actuated by said piston-cylinder unit and a second portion parallel to the first portion engageable with the stack around the respective needle.

7. The apparatus defined in claim 6 wherein said second portion has an elongated slit opening toward said needle.

8. The apparatus defined in claim 2 wherein said second portion engages around said needle through at least 180°.

* * * * *